(12) United States Patent
Iwatsuki et al.

(10) Patent No.: US 10,439,472 B2
(45) Date of Patent: Oct. 8, 2019

(54) ARMATURE, ARMATURE MANUFACTURING METHOD, AND ROTATING ELECTRICAL DEVICE

(71) Applicant: ASMO CO., LTD., Kosai, Shizuoka-pref. (JP)

(72) Inventors: Kazumasa Iwatsuki, Kosai (JP); Eiji Hoshikawa, Kosai (JP); Takeshi Mamiya, Kosai (JP); Tomoki Kubo, Kosai (JP); Kiyomi Takahashi, Toyohashi (JP); Masayuki Inoue, Anjo (JP)

(73) Assignee: DENSO CORPORATION, Kariya, Aichi-Pref (JP)

( * ) Notice: Subject to any disclaimer, the term of this patent is extended or adjusted under 35 U.S.C. 154(b) by 464 days.

(21) Appl. No.: 15/201,510

(22) Filed: Jul. 4, 2016

(65) Prior Publication Data

US 2017/0012490 A1 Jan. 12, 2017

(30) Foreign Application Priority Data

Jul. 6, 2015 (JP) .................................. 2015-135072

(51) Int. Cl.
*H02K 7/04* (2006.01)
*H02K 23/30* (2006.01)
(Continued)

(52) U.S. Cl.
CPC ............... *H02K 7/04* (2013.01); *H02K 15/09* (2013.01); *H02K 15/165* (2013.01); *H02K 23/30* (2013.01); *H02K 3/28* (2013.01)

(58) Field of Classification Search
CPC .......... H02K 7/04; H02K 7/003; H02K 23/30; H02K 3/28; H02K 3/50
(Continued)

(56) References Cited

U.S. PATENT DOCUMENTS

| | | | |
|---|---|---|---|
| 2004/0103733 A1* | 6/2004 | Sumita | F16H 1/20 74/421 A |
| 2005/0118044 A1* | 6/2005 | Inoue | F02M 37/08 417/423.7 |

(Continued)

FOREIGN PATENT DOCUMENTS

| | | |
|---|---|---|
| JP | S55-166472 A | 12/1980 |
| JP | 2001-268878 A | 9/2001 |

(Continued)

OTHER PUBLICATIONS

English language translation of the following: Office action dated Jan. 22, 2019 from the JPO in a Japanese patent application No. 2015-135072 corresponding to the instant patent application. This office action translation is submitted now in order to supplement the understanding of the cited references which are being disclosed in the instant Information Disclosure Statement.

*Primary Examiner* — Michael Andrews
(74) *Attorney, Agent, or Firm* — SOLARIS Intellectual Property Group, PLLC

(57) ABSTRACT

An armature manufacturing method includes preparing a core member that includes a rotation shaft at a central portion and that is formed with plural teeth in a radiating shape centered on the rotation shaft; and winding winding wires onto slots between the plural teeth so as to form plural types of winding coil sections, each with a different winding wire diameter.

2 Claims, 8 Drawing Sheets

(51) Int. Cl.
*H02K 15/09* (2006.01)
*H02K 15/16* (2006.01)
*H02K 3/28* (2006.01)

(58) Field of Classification Search
USPC ..................... 310/198, 195–197, 199–208
See application file for complete search history.

(56) References Cited

U.S. PATENT DOCUMENTS

2011/0050025 A1* 3/2011 Doushita ................ H02K 1/146
310/198
2016/0211719 A1* 7/2016 Hidaka ................ H02K 1/2733

FOREIGN PATENT DOCUMENTS

JP 3625202 B2 3/2005
JP 2014-187755 A 10/2014

* cited by examiner

ARMATURE, ARMATURE MANUFACTURING METHOD, AND ROTATING ELECTRICAL DEVICE

CROSS-REFERENCE TO RELATED APPLICATION

This application claims priority under 35 USC 119 from Japanese Patent Application No. 2015-135072 filed on Jul. 6, 2015, the disclosures of which is incorporated by reference in its entirety.

BACKGROUND

Technical Field

The present disclosure relates to an armature, an armature manufacturing method, and a rotating electrical device.

Related Art

Armatures including a rotation shaft, a core member formed with plural teeth in a radiating shape centered on the rotation shaft, and windings (winding wires) wound into slots between the plural teeth, exist as conventional armatures of rotating electrical devices (see, for example, Japanese Patent No. 3625202). There is a possibility of vibration or noise occurring if the weight balance in the circumferential direction is upset in such armatures.

Adding a balancing member to the armature, or correcting the balance after assembling the armature, are conceivable as methods in order to correct the weight balance in the circumferential direction of the armature. However, in such cases, there is an increase in costs due to increasing the number of components or the number of processes.

SUMMARY

In consideration of the above circumstances, the present disclosure provides an armature of a rotating electrical device and a manufacturing method thereof capable of correcting a weight balance in the circumferential direction, while suppressing an increase in costs.

A first aspect of the present disclosure is an armature manufacturing method including: preparing a core member that includes a rotation shaft at a central portion and that is formed with plural teeth in a radiating shape centered on the rotation shaft; and winding winding wires onto slots between the plural teeth so as to form plural types of winding coil sections, each with a different winding wire diameter.

In this aspect, in cases in which a variation occurs in the weight balance in the circumferential direction of an armature, for example, the variation in the weight balance in the circumferential direction of the armature may be corrected by disposing the plural types of winding coil sections, each with a different winding wire diameter, in the circumferential direction of the core member so as to rectify this variation in the weight balance.

The weight balance in the circumferential direction of the armature may be corrected by differing the diameters of the winding wires forming the plural types of winding coil sections, thereby preventing an increase in the number of components and the number of processes and an increase in the costs.

In the present aspect, the winding of the winding wires may include: using plural flyers to wind the winding wires; and causing the diameters of the winding wires respectively forming the plural types of winding coil sections to be different by differing tensions of the plural flyers to differ the amount of extension of the winding wires wound using the plural flyers.

In the above method, in order to differ the diameters of the winding wires respectively forming the plural types of winding coil sections, it is sufficient to differ the tensions of the plural flyers to differ the amount of extension of the winding wires wound using the plural flyers, thereby enabling a reduction in costs.

In the present aspect, the diameters of the winding wires supplied to the plural flyers may be the same.

In the above method, the diameters of the winding wires supplied to the plural flyers are the same, and a common winding wire may be employed in the respective flyers. This enables a reduction in costs compared, for example, to cases in which winding wires supplied to the plural flyers are employed with different diameters from each other.

In the present aspect, the rotation shaft may include a notch shaped D-shaped cut portion by forming a D-shaped cut in a leading end portion thereof; and the winding of the winding wires may include: forming, as the plural types of winding coil sections, two types of winding coil sections using a pair of flyers serving as the plural flyers, the two types of winding coil sections including plural first winding coil sections and plural second winding coil sections that have a smaller winding wire diameter than the plural first winding coil sections, and the plural first winding coil sections and the plural second winding coil sections being formed by distributed winding, such that a winding wire inserted into one of the slots that faces the D-shaped cut portion is a winding wire forming the first winding coil sections, and a winding wire inserted into a slot at the opposite side to the slot facing the D-shaped cut portion is a winding wire forming the second winding coil sections.

In the above method, the winding wire inserted into the slot facing the D-shaped cut portion configures a winding wire (a heavier winding wire with a larger diameter) forming the first winding coil sections, and the winding wire inserted into the slot at the opposite side to the slot facing the D-shaped cut portion configures a winding wire (a lighter winding wire with a smaller diameter) forming the second winding coil sections.

This enables a relative increase in weight occurring at the opposite side of the rotation shaft to the D-shaped cut portion side to be offset by the amount of a reduction in weight due to the winding wire inserted into the slot at the opposite side to the slot facing the D-shaped cut portion being a winding wire forming the second winding coil sections. Thus, the weight balance in the circumferential direction of the armature may be corrected, even in cases in which a variation in the weight balance in the circumferential direction of the armature has occurred due to making the D-shaped cut in the rotation shaft.

In the present aspect, the plural first winding coil sections and the plural second winding coil sections may be formed such that an amount of a reduction in weight due to the D-shaped cut portion is equivalent to a weight difference between the plural first winding coil sections and the plural second winding coil sections.

In the above method, the amount of the reduction in weight due to the D-shaped cut portion is adjusted so as to be equivalent to the weight difference between the plural first winding coil sections (winding wires with a larger diameter) and the plural second winding coil sections (winding wires with a smaller diameter), thereby enabling the weight balance in the circumferential direction of the armature to be even better.

A second aspect of the present disclosure is an armature including: a rotation shaft; a core member in which the rotation shaft is disposed at a central portion and that includes plural teeth formed in a radiating shape centered on the rotation shaft; and plural types of winding coil sections that each have a different winding wire diameter and that are respectively formed by winding winding wires onto slots between the plural teeth.

In this aspect, in cases in which a variation occurs in the weight balance in the circumferential direction of the armature, for example, the variation in the weight balance in the circumferential direction of the armature may be corrected by disposing the plural types of winding coil sections, each with a different winding wire diameter, in the circumferential direction of the core member so as to rectify this variation in the weight balance.

The weight balance in the circumferential direction of the armature may be corrected by differing the diameters of the winding wires forming the plural types of winding coil sections, thereby preventing an increase in the number of components and the number of processes, and an increase in costs.

In the present aspect, the rotation shaft may include a notch shaped D-shaped cut portion by forming a D-shaped cut in a leading end portion thereof;

the plural types of winding coil sections may include plural first winding coil sections and plural second winding coil sections that have a smaller winding wire diameter than the plural first winding coil sections; and the plural first winding coil sections and the plural second winding coil sections may be formed by distributed winding, such that a winding wire inserted into one of the slots that faces the D-shaped cut portion is a winding wire forming the first winding coil sections, and a winding wire inserted into a slot at the opposite side to the slot facing the D-shaped cut portion is a winding wire forming the second winding coil sections.

In the above configuration, the winding wire inserted into the slot facing the D-shaped cut portion is a winding wire (a heavier winding wire with a larger diameter) forming the first winding coil sections, and the winding wire inserted into the slot at the opposite side to the slot facing the D-shaped cut portion configures a winding wire (a lighter winding wire with a smaller diameter) forming the second winding coil sections.

Therefore, a relative increase in weight occurring at the opposite side of the rotation shaft to the D-shaped cut portion side may be offset by the amount of a reduction in weight due to the winding wire inserted into the slot at the opposite side to the slot facing the D-shaped cut portion being a winding wire forming the second winding coil sections. This enables the weight balance in the circumferential direction of the armature to be corrected, even in cases in which a variation in the weight balance in the circumferential direction of the armature has occurred due to making the D-shaped cut in the rotation shaft.

In the present aspect, the plural first winding coil sections and the plural second winding coil sections may be formed such that an amount of a reduction in weight due to the D-shaped cut portion is equivalent to a weight difference between the plural first winding coil sections and the plural second winding coil sections.

In the above configuration, since the amount of the reduction in weight due to the D-shaped cut portion is adjusted so as to be equivalent to the weight difference between the plural first winding coil sections (winding wires with a larger diameter) and the plural second winding coil sections (winding wires with a smaller diameter), the weight balance in the circumferential direction of the armature may be improved.

A third aspect of the present disclosure is a rotating electrical device including the armature of the second aspect. Since there is a good weight balance in the circumferential direction of the armature in the present aspect, vibration and noise can be suppressed from occurring.

BRIEF DESCRIPTION OF THE DRAWINGS

Exemplary embodiments of the present invention will be described in detail based on the following figures, wherein.

DETAILED DESCRIPTION

Explanation follows regarding an exemplary embodiment of the present disclosure.

Configuration of Rotating Electrical Device

Figure 1:
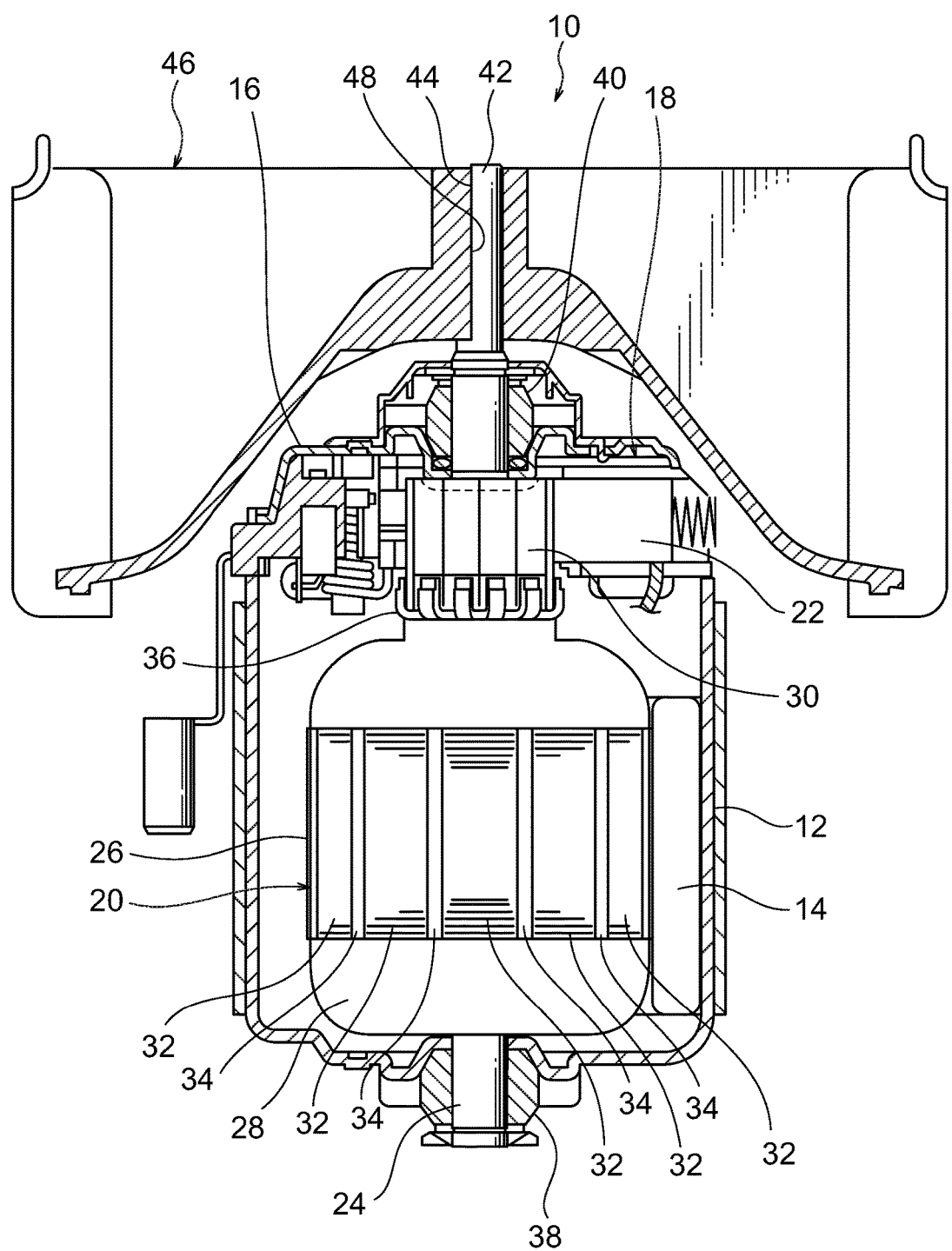
FIG. 1 is a lateral cross-section of a rotating electrical device according to an exemplary embodiment of the present disclosure.

As illustrated in FIG. 1, as an example, a rotating electrical device 10 according to the present exemplary embodiment is configured as a brushed direct current motor, and includes a motor yoke 12, a magnet 14, front housing 16, a brush device 18, and an armature 20.

The motor yoke 12 is formed in a bottomed tube shape, and the magnet 14 is fixed to an inner peripheral face of the motor yoke 12. The front housing 16 is provided at an opening side of the motor yoke 12, and the brush device 18 is provided inside the front housing 16. A brush 22 is provided to the brush device 18.

The armature 20 is housed inside the motor yoke 12, and includes a rotation shaft 24, a core member 26, windings (winding wires) 28, and a commutator 30. The rotation shaft 24 is provided at a central portion of the core member 26. Plural teeth 32 are formed to the core member 26 in a radiating shape centered on the rotation shaft 24 (see also FIG. 2). Leading end portions of the plural teeth 32 face the magnet 14.

Slots 34 are respectively formed between the plural teeth 32, and the windings 28 are wound in the slots 34 by an armature manufacturing method, described later. The windings 28 are connected to claw portions 36 formed to the commutator 30, and the brush 22 contacts and slides against the commutator 30.

A rear end side of the rotation shaft 24 is supported so as to be capable of rotating by a bearing 38 provided to a bottom portion of the motor yoke 12. A leading end side of the rotation shaft 24 is supported so as to be capable of rotating by a bearing 40 provided to the front housing 16. A leading end portion 42 of the rotation shaft 24 projects out from the front housing 16. A D-shaped cut portion 44, this being a notch shape with a D-shaped cross-section is formed by making a D-shaped cut in the leading end portion 42 of the rotation shaft 24.

As an example, the rotating electrical device 10 of the present exemplary embodiment is employed as a fan motor, and a fan 46 is fixed to the leading end portion 42 of the rotation shaft 24. A hole 48 with a D-shaped cross-section is formed in a central portion of the fan 46. The leading end portion 42 (projecting portion) of the rotation shaft 24 with the D-shaped cross-section is inserted into and fitted together with the hole 48.

Manufacturing Method of Armature

Explanation follows regarding an armature manufacturing method according to an exemplary embodiment of the present disclosure, with reference to FIGS. 2 to 5.

Figure 2:
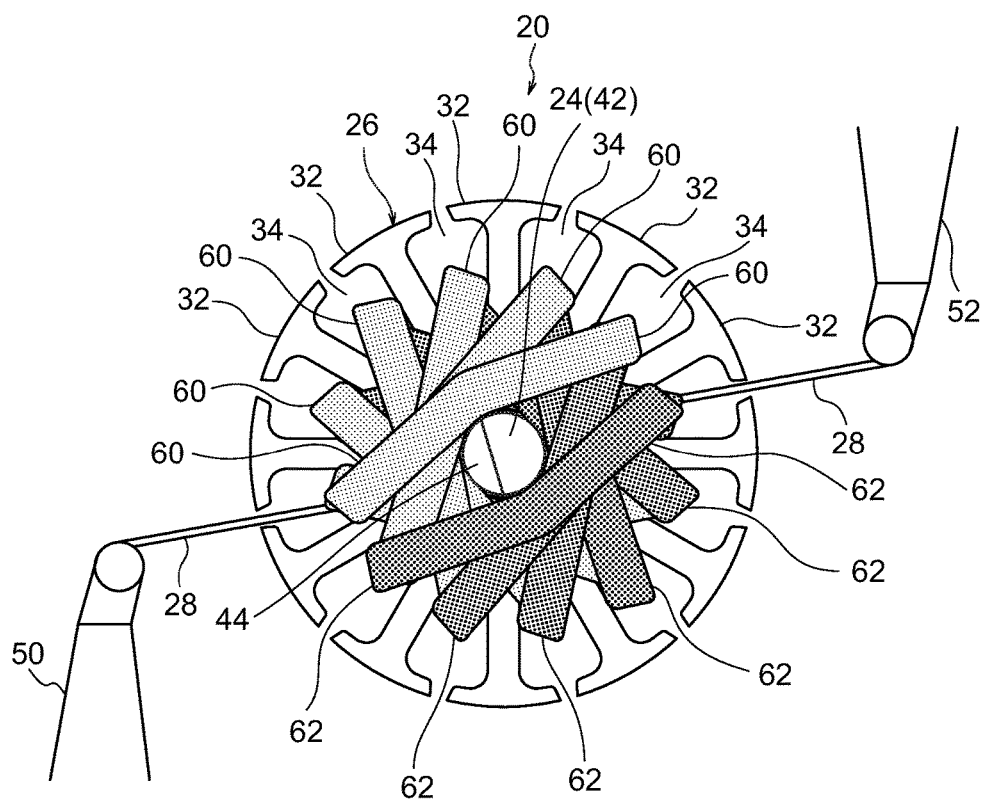
FIG. 2 is a plan view of an armature according to an exemplary embodiment.

As illustrated in FIG. 2, in the present exemplary embodiment, for example, the windings 28 are wound onto the core member 26 that includes twelve of the slots 34.

A pair of flyers 50, 52 are employed to wind the windings 28. The pair of flyers 50, 52 are respectively disposed on either side of the rotation shaft 24. Two different types of winding coil sections are formed on the core member 26 using the pair of flyers 50, 52. Namely, plural first winding coil sections 60 (indicated by small dots) are formed using one flyer 50 (an L flyer), and plural second winding coil sections 62 (indicated by large dots) are formed using the other flyer 52 (an R flyer). The first winding coil sections 60 and the second winding coil sections 62 are both formed by distributed winding.

Formation of each first winding coil section 60 using the one flyer 50 and formation of each second winding coil section 62 using the other flyer 52 are performed at the same time. The first winding coil section 60 and the respective second winding coil section 62 that are formed using the pair of flyers 50, 52 at the same time are disposed with point symmetry centered on the rotation shaft 24.

Although diameters of the windings 28 respectively supplied to the pair of flyers 50, 52 from winding bobbins, not illustrated in the drawings, are the same, the windings that form the second winding coil sections 62 have a smaller diameter than the windings that form the first winding coil sections 60.

Namely, in the present exemplary embodiment, one of the flyer 52 is operated so as to have a higher tension than the other flyer 50. Since the flyer 52 is operated so as to have a higher tension than the flyer 50, an amount of extension of the windings 28 wound using the flyer 52 is larger than an amount of extension of the windings 28 wound using the flyer 50. Since the amount of extension of the windings 28 wound using the flyer 52 is larger than the amount of extension of the windings 28 wound using the flyer 50, the windings forming the second winding coil sections 62 have a smaller diameter than the windings forming the first winding coil sections 60.

FIGS. 3A to 3C and FIGS. 4A to 4C illustrate manufacturing processes of the armature 20 illustrated in FIG. 2. In FIGS. 3A to 3C and FIGS. 4A to 4C, identification numbers 1 to 12 are appended to the reference numerals of the plural slots 34 in order to identify each of the plural slots 34. Similarly, identification numbers 1 to 6 are appended to the reference numerals of the plural first winding coil sections 60 and the plural second winding coil sections 62. A flat face 44A is formed in the leading end portion 42 of the rotation shaft 24 by making the D-shaped cut. A center line CL that is orthogonal to the flat face 44A passes through the slot 34-1 and the slot 34-7. Detailed explanation follows regarding the manufacturing method of the armature 20.

Figure 3A:
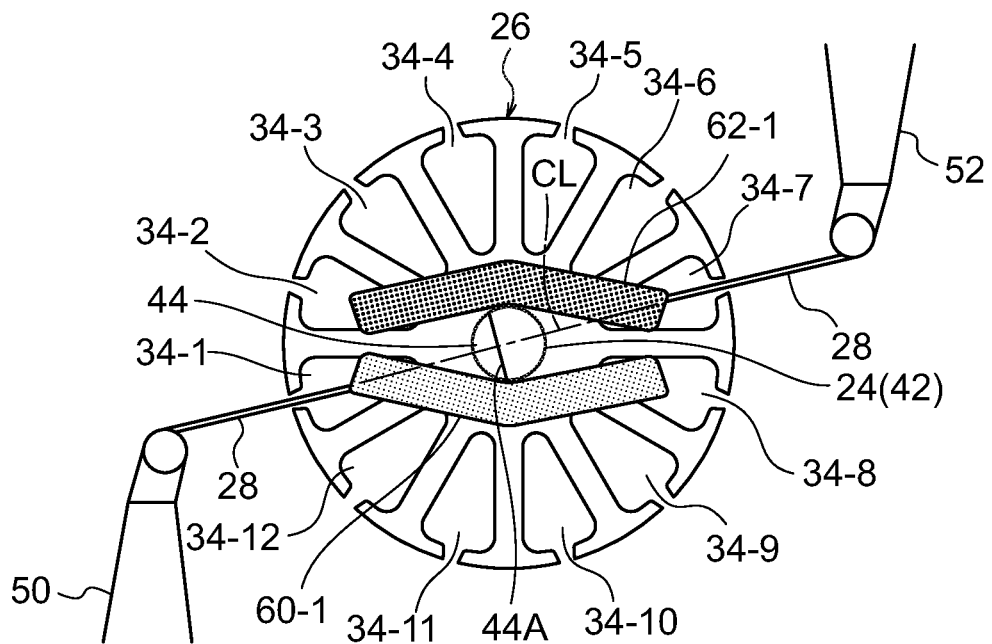
FIGS. 3A to 3C are first explanatory drawings for explaining a manufacturing method of an armature according to an exemplary embodiment.

First as illustrated in FIG. 3A, the windings 28 are distribution-wound straddling between the two slots 34-1, 34-8 using one of the flyer 50, forming the first winding coil section 60-1 that is a first layer. Similarly, the windings 28 are distribution-wound straddling between the two slots 34-7, 34-2 using the other flyer 52, forming the second winding coil section 62-1 that is a first layer.

Figure 3B:
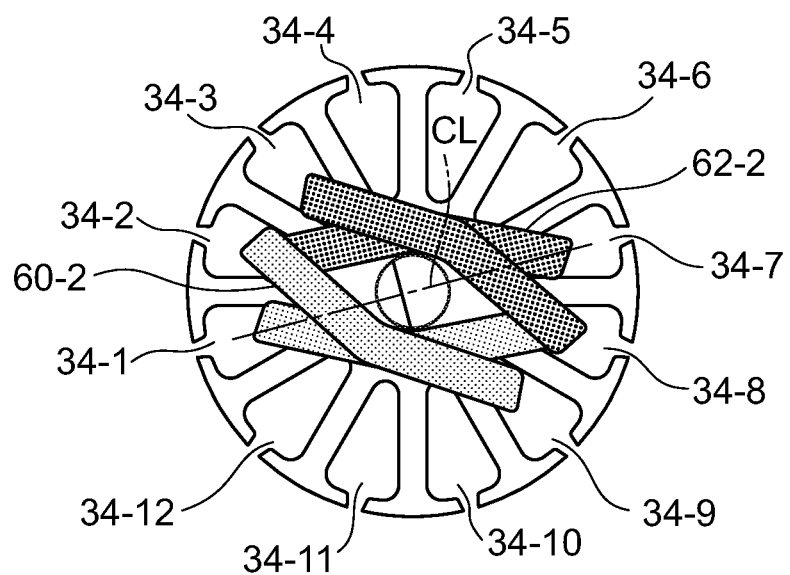

Next, as illustrated in FIG. 3B, the windings 28 are distribution-wound straddling between the two slots 34-2, 34-9 using the flyer 50, forming the first winding coil section 60-2 that is a second layer. Similarly, the windings 28 are distribution-wound straddling between the two slots 34-8, 34-3 using the flyer 52, forming the second winding coil section 62-2 that is a second layer.

Figure 3C:
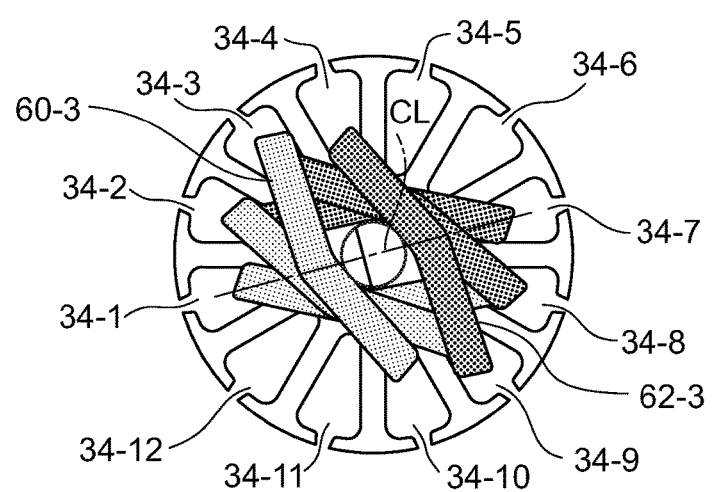

Next, as illustrated in FIG. 3C, the windings 28 are distribution-wound straddling between the two slots 34-3, 34-10 using the flyer 50, forming the first winding coil section 60-3 that is a third layer. Similarly, the windings 28 are distribution-wound straddling between the two slots 34-9, 34-4 using the flyer 52, forming the second winding coil section 62-3 that is a third layer.

Figure 4A:
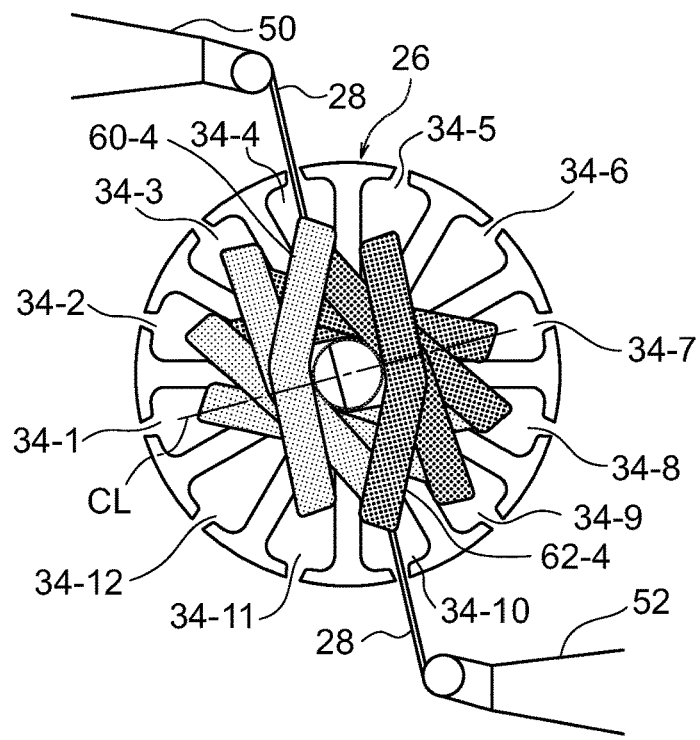
FIGS. 4A to 4C are second explanatory drawings for explaining a manufacturing method of an armature according to an exemplary embodiment.

Next, as illustrated in FIG. 4A, the windings 28 are distribution-wound straddling between the two slots 34-4, 34-11 using the flyer 50, forming the first winding coil section 60-4 that is a fourth layer. Similarly, the windings 28 are distribution-wound straddling between the two slots 34-10, 34-5 using the flyer 52, forming the second winding coil section 62-4 that is a fourth layer.

Figure 4B:
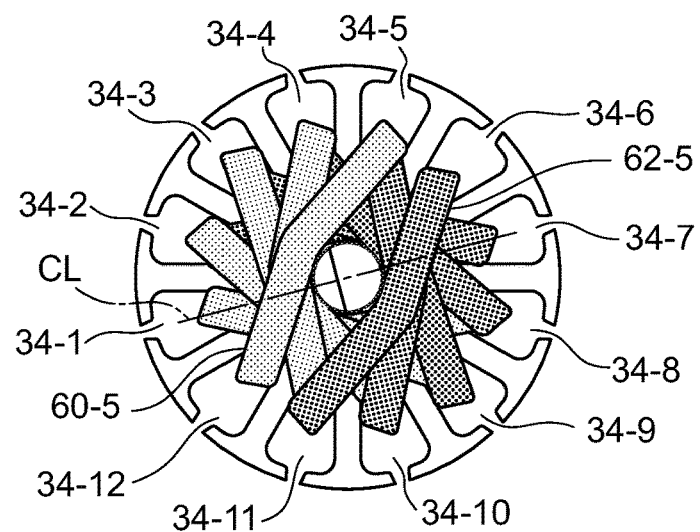

Next, as illustrated in FIG. 4B, the windings 28 are distribution-wound straddling between the two slots 34-5, 34-12 using the flyer 50, forming the first winding coil section 60-5 that is a fifth layer. Similarly, the windings 28 are distribution-wound straddling between the two slots 34-11, 34-6 using the flyer 52, forming the second winding coil section 62-5 that is a fifth layer.

Figure 4C:
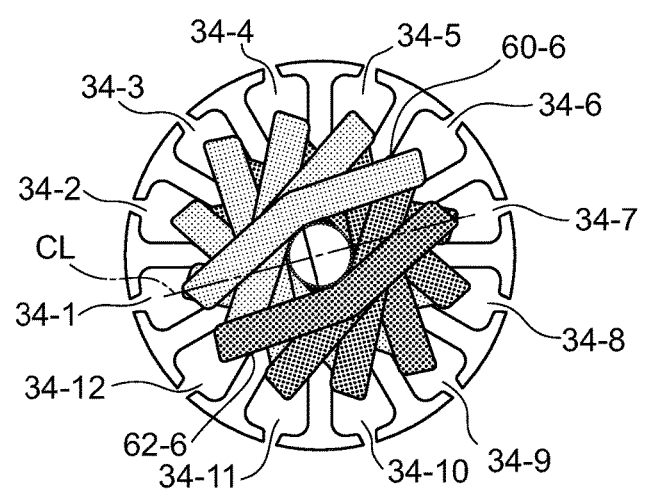

Next, as illustrated in FIG. 4C, the windings 28 are distribution-wound straddling between the two slots 34-6, 34-1 using the flyer 50, forming the first winding coil section 60-6 that is a sixth layer. Similarly, the windings 28 are distribution-wound straddling between the two slots 34-12, 34-7 using the flyer 52, forming the second winding coil section 62-6 that is a sixth layer.

Thus, in the present exemplary embodiment, one cycle of winding of the plural first winding coil sections 60 and the plural second winding coil sections 62 is performed while moving a winding start position of the first winding coil sections 60 from the slots 34-1 to 6 in sequence, and moving a winding start position of the second winding coil sections 62 is moved from the slots 34-7 to 12 in sequence.

Figure 5:
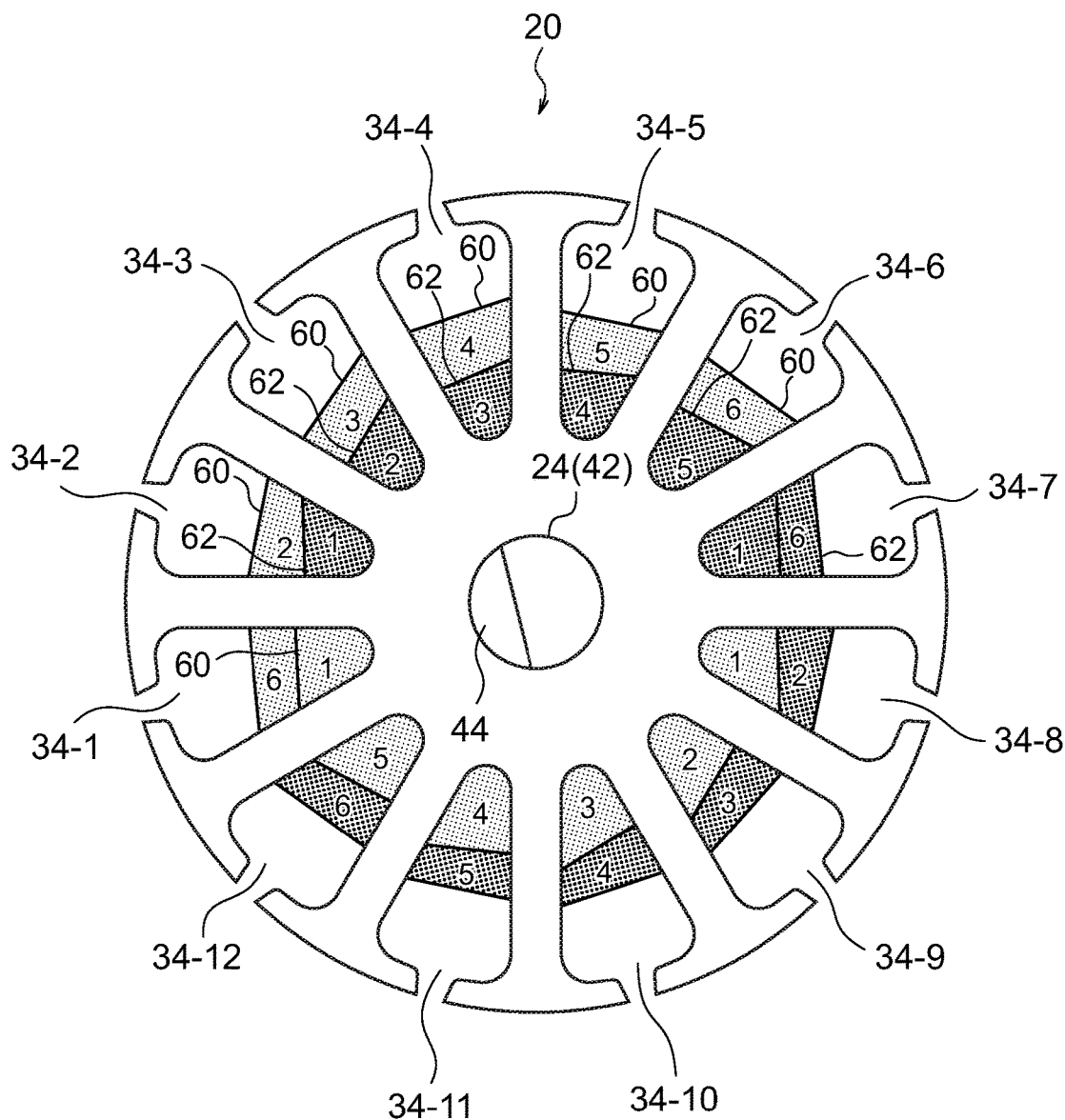
FIG. 5 is a lateral cross-section of an armature manufactured by an armature manufacturing method according to an exemplary embodiment.

FIG. 5 is a lateral cross-section of the armature 20 manufactured in the manner described above. In FIG. 5, the above-described identification numbers 1 to 6 are included in the cross-section of the first winding coil sections 60 and the second winding coil sections 62.

As illustrated in FIG. 5, the windings forming the first winding coil sections 60 and the windings forming the second winding coil sections 62 are mixed together in the windings that are inserted into the slots 34-2 to 6 and 34-8 to 12. However, the windings inserted into the slot 34-1 facing the D-shaped cut portion 44 are each windings forming the first winding coil sections 60, and the windings inserted into the slot 34-7 at the opposite side to the slot 34-1 are each windings forming the second winding coil sections 62.

Thus, in the present exemplary embodiment, the windings inserted into the slot 34-1 facing the D-shaped cut portion 44 are windings forming the heavier first winding coil sections 60 that have a larger diameter, and the windings inserted into the slot 34-7 at the opposite side to the slot 34-1 are windings forming the lighter second winding coil sections 62 that have a smaller diameter. Thus, the amount of a relative increase in weight occurring at the opposite side to the D-shaped cut portion 44 side due to making the D-shaped cut in the rotation shaft 24 is offset by the amount of a reduction in weight due to the windings inserted into the slot 34-7 each being windings forming the second winding coil sections 62.

Note that portions of the plural first winding coil sections 60 and the plural second winding coil sections 62 that are outside the slots (see FIG. 2 to FIGS. 4A to 4C) have an influence on the weight balance. However, the plural first winding coil sections 60 and the plural second winding coil sections 62 are wound onto the entire periphery of the core member 26, thereby creating a state in which the weight difference between the portions of the plural first winding coil sections 60 and the plural second winding coil sections 62 that are outside the slots is offset. Thus, only the portions inserted into the slots 34 have an effect on the weight difference between the plural first winding coil sections 60 and the plural second winding coil sections 62.

In the present exemplary embodiment, the tensions of the pair of flyers 50, 52 (the amount of extension of the windings 28) described above, and thereby the diameters of the windings 28, are adjusted such that the amount of the reduction in weight due to the D-shaped cut portion 44 is equivalent to the weight difference between the plural first winding coil sections 60 and the plural second winding coil sections 62.

Since tension differs according to the diameter, the number of turns, the winding method (one cycle of winding or two cycles of winding), and so on of the windings 28, data is prepared for each product type, data is read when switching the product type to be manufactured, and the most appropriate tension for each product type is set.

When the other flyer 52 is operated so as to have a higher tension than the one flyer 50, the windings 28 of the second winding coil sections 62 have a smaller diameter than those of the first winding coil sections 60, and the second winding coil sections 62 are also wound tighter than the first winding coil sections 60, thereby improving the space factor. The length of the windings 28 of the second winding coil sections 62 is also shorter than those of the first winding coil sections 60, and inertia is also reduced due to the second winding coil sections 62 being disposed nearer to the radial direction inside of the core member 26. The weight balance in the circumferential direction of the armature 20 is corrected in this manner.

Explanation follows regarding operation and advantageous effects of the present exemplary embodiment of the disclosure.

As described in detail above, in the armature manufacturing method according to the present exemplary embodiment, the windings inserted into the slot 34-1 facing the D-shaped cut portion 44 configure the windings (heavier windings with a larger diameter) forming the first winding coil sections 60, and the windings inserted into the slot 34-7 at the opposite side to the slot 34-1 facing the D-shaped cut portion 44 configure the windings (lighter windings with a smaller diameter) forming the second winding coil sections 62.

This enables the amount of the relative increase in weight occurring at the opposite side of the rotation shaft 24 to the D-shaped cut portion 44 side to be offset by the amount of the reduction in weight due to the windings inserted into the slot 34-7 being windings forming the second winding coil sections 62. The weight balance in the circumferential direction of the armature 20 may be thereby corrected, even in cases in which a variation in the weight balance in the circumferential direction of the armature 20 has occurred due to making the D-shaped cut on the rotation shaft 24.

In the armature manufacturing method according to the present exemplary embodiment, the amount of the reduction in weight due to the D-shaped cut portion 44 is adjusted so as to be equivalent to the weight difference between the plural first winding coil sections 60 (windings with a larger diameter) and the plural second winding coil sections 62 (windings with a smaller diameter). Thus, the weight balance in the circumferential direction of the armature 20 may be even better.

In the armature manufacturing method according to the present exemplary embodiment, the weight balance in the circumferential direction of the armature 20 can be corrected by differing the diameters of the windings forming the two types of winding coil sections, thereby enabling an increase in the number of components and the number of processes to be suppressed. Thus, an increase in costs may be suppressed.

In the armature manufacturing method according to the present exemplary embodiment, in order to differ the diameters of the windings respectively forming the two types of winding coil sections, it is sufficient to differ the tensions of the pair of flyers 50, 52 and thereby differ the amounts of extension of the windings 28 wound using the pair of flyers 50, 52, thereby enabling a reduction in costs.

In the armature manufacturing method according to the present exemplary embodiment, the diameters of the windings supplied to the pair of flyers 50, 52 are the same, and common windings can be employed by the respective flyers 50, 52. This enables a reduction in costs compared to, for example, cases in which windings supplied to the pair of flyers 50, 52 are employed with different diameters from each other.

In the rotating electrical device 10 of the present exemplary embodiment, there is a good weight balance in the circumferential direction of the armature 20, thereby enabling the occurrence of vibration or noise to be suppressed.

Explanation follows regarding modified examples of an exemplary embodiment of the present disclosure.

In the above exemplary embodiment, the plural first winding coil sections 60 and the plural second winding coil sections 62 configure one cycle of winding; however, two or more cycles of winding may be performed.

Figure 6:
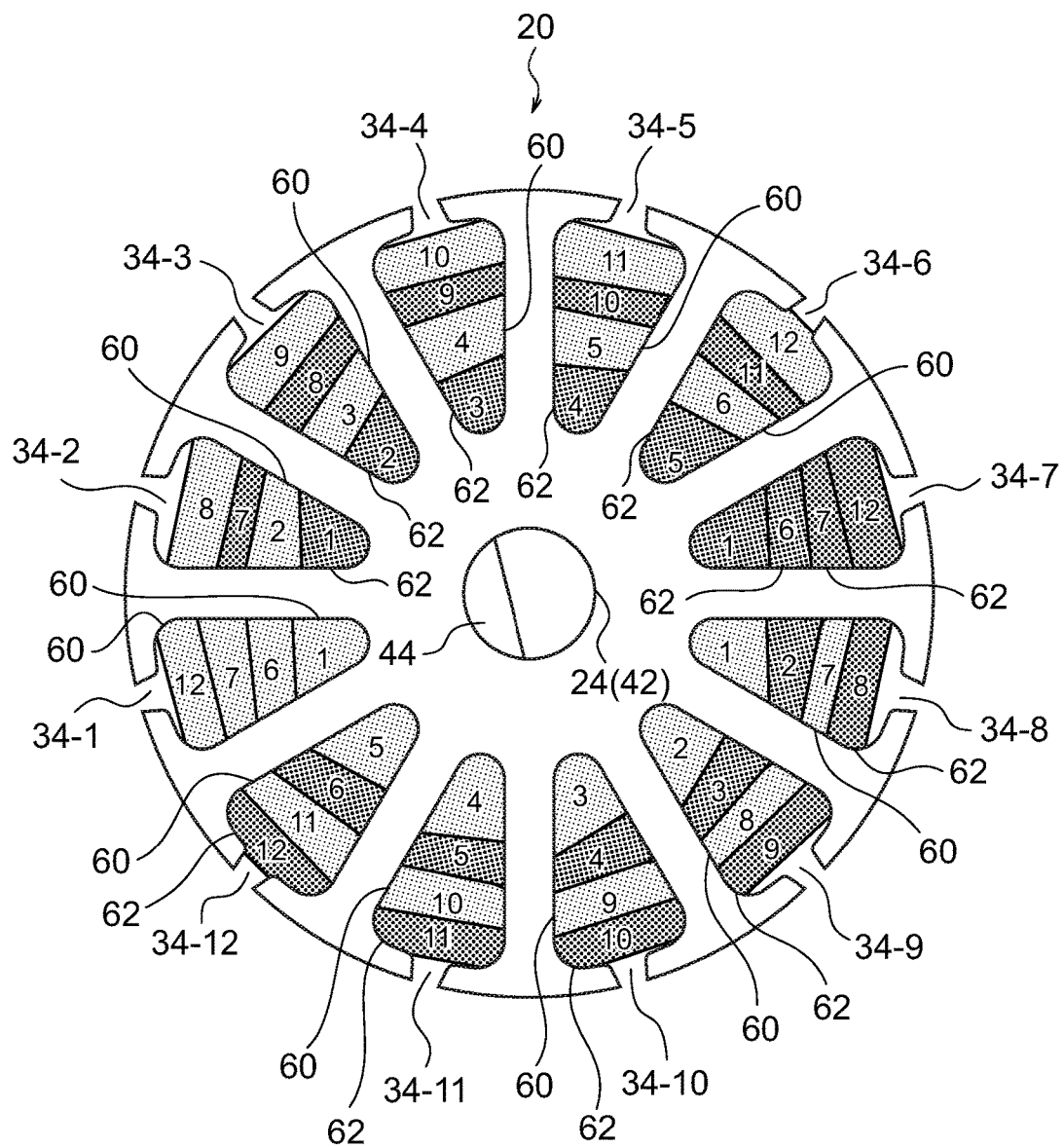
FIG. 6 is a lateral cross-section of an armature manufactured by an armature manufacturing method according to a modified example.

FIG. 6 illustrates a state in which the plural first winding coil sections 60 and the plural second winding coil sections 62 have been wound for two cycles in the armature 20. In this modified example, the winding coil sections that have been wound using one flyer during the first cycle configure the first winding coil sections 60, and the winding coil sections that have been wound using another flyer during the second cycle configure the first winding coil sections 60. Similarly, in this modified example, the winding coil sections that have been wound using the other flyer during the first cycle configure the second winding coil sections 62, and the winding coil sections that have been wound using the one flyer during the second cycle configure the second winding coil sections 62.

Namely, during the first cycle, the other flyer is operated so as to have a higher tension than the one flyer and the second winding coil sections 62 are using the other flyer, whereas during the second cycle, the one flyer is operated so as to have a higher tension than the other flyer and the second winding coil sections 62 are formed using the one flyer.

In cases in which in which the plural first winding coil sections 60 and the plural second winding coil sections 62 have been wound for two cycles in this manner, the windings inserted into the slot 34-1 facing the D-shaped cut portion 44 configure the windings (heavier windings with a larger diameter) forming the first winding coil sections 60, and the windings inserted into the slot 34-7 at the opposite side to the slot 34-1 configure the windings (lighter windings with a smaller diameter) forming the second winding coil sections 62.

This enables the relative increase in weight occurring at the opposite side of the rotation shaft 24 to the D-shaped cut portion 44 side to be offset by the amount of a reduction in weight due to the windings inserted into the slot 34-7 being windings forming the second winding coil sections 62. The weight balance in the circumferential direction of the armature 20 may be thereby corrected, even in cases in which a variation in the weight balance in the circumferential direction of the armature 20 has occurred due to making the D-shaped cut on the rotation shaft 24.

In the above exemplary embodiment, the diameters of the windings supplied to the pair of flyers 50, 52 are the same; however, the diameters of the windings supplied to the pair of flyers 50, 52 may be different.

In the above exemplary embodiment, the core member 26 includes twelve slots; however, a number other than twelve slots may be included.

In the above exemplary embodiment, the armature 20 includes the plural winding coil sections that are wound distributed; however, the armature 20 may include plural winding coil sections that are wound concentrated. In cases in which a variation occurs in the weight balance in the circumferential direction of the armature 20, the variation in the weight balance in the circumferential direction of the armature 20 may be corrected by disposing plural types of winding coil sections with different winding diameters from each other in the circumferential direction of the core member 26 so as to rectify this variation in the weight balance.

In the above exemplary embodiment, two types of winding coil sections with different winding diameters are formed in the armature 20; however, three or more types of winding coil sections with different winding diameters may be formed instead.

In the above exemplary embodiment, the armature 20 is configured as a brushed direct current motor; however, the armature 20 may be configured as a motor other than a brushed direct current motor.

Modified examples from out of the above plural modified examples that can be combined may be combined as appropriate.

An exemplary embodiment of the present disclosure has been explained above; however, the present disclosure is not limited to the above description, and obviously various modifications may be implemented within a range not departing from the spirit of the present disclosure.

What is claimed is:
1. An armature comprising:
a rotation shaft;
a core member in which the rotation shaft is disposed at a central portion and that includes a plurality of teeth formed in a radiating shape centered on the rotation shaft; and
a plurality of types of winding coil sections that are respectively formed by winding winding wires onto slots between the plurality of teeth, wherein:
the rotation shaft includes a notch shaped D-shaped cut portion by forming a D-shaped cut in a leading end portion thereof;
the plurality of types of winding coil sections include a plurality of first winding coil sections and a plurality of second winding coil sections, the first winding coil sections being composed of a winding wire that is of a wider diameter and a heavier weight than the winding wire that composes the second winding coil sections; and
the plurality of first winding coil sections and the plurality of second winding coil sections are formed by distributed winding, such that a winding wire inserted into a first slot, that is one of the slots that faces the D-shaped cut portion, is the winding wire forming the first winding coil sections, and a winding wire inserted into a second slot at the opposite side to the first slot across the rotation shaft is the winding wire forming the second winding coil sections; and
a reduction in weight of the rotation shaft due to the D-shaped cut is equivalent to a weight difference between the plurality of first winding coil sections and the plurality of second winding coil sections.
2. A rotating electrical device comprising the armature of claim 1.

* * * * *